No. 731,762. PATENTED JUNE 23, 1903.
F. DRAEGER.
IMPLEMENT FOR CLEARING STREETS, ROADS, OR FOOTPATHS.
APPLICATION FILED DEC. 31, 1902.
NO MODEL.
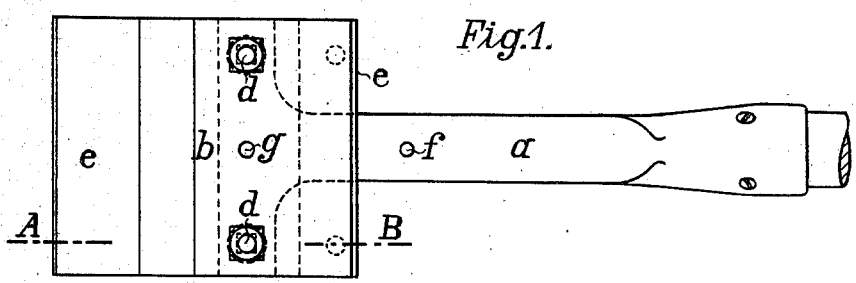
Fig. 1.
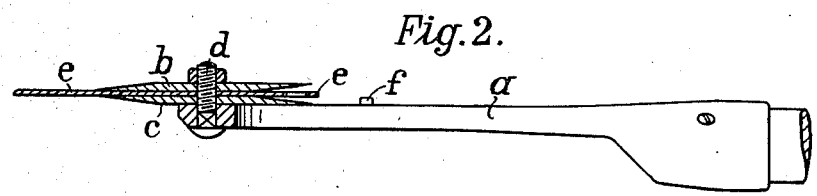
Fig. 2.
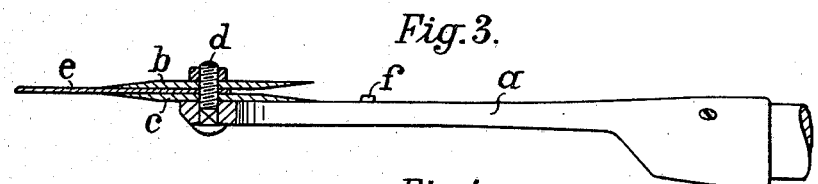
Fig. 3.
Fig. 4.
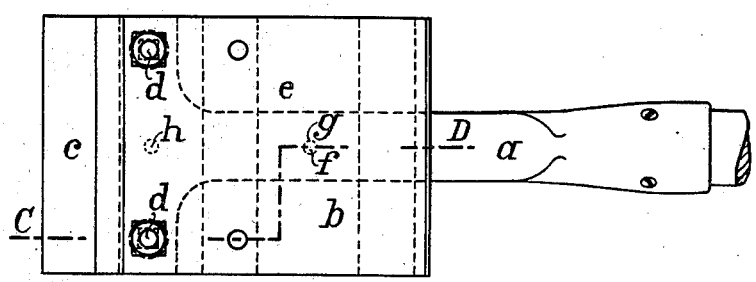
Fig. 5.
Witnesses
Chas. N. Smith
J. Staib
Inventor
Franz Draeger
per Harold Serrell
Atty No. 731,762. Patented June 23, 1903.

UNITED STATES PATENT OFFICE.

FRANZ DRAEGER, OF DRESDEN, GERMANY.

IMPLEMENT FOR CLEARING STREETS, ROADS, OR FOOTPATHS.

SPECIFICATION forming part of Letters Patent No. 731,762, dated June 23, 1903.

Application filed December 31, 1902. Serial No. 137,287. (No model.)

*To all whom it may concern:*

Be it known that I, FRANZ DRAEGER, a subject of the King of Prussia, German Emperor, and a resident of Dresden, Kingdom of Saxony, German Empire, have invented new and useful Improvements in Implements for Clearing Streets, Roads, or Footpaths, of which the following is a specification.

For clearing smooth-paved roads and footpaths of snow and ice picks and scrapers have hitherto been used, which when their edges have become blunt had to be sent away for resharpening, and owing to the heavy wear to which the iron of the implements in question is subjected they had to be resharpened several times a day. This not only causes an undesirable interruption of the clearing operations, but also forms a source of considerable expense, and, moreover, the implements in order to maintain their weight have soon to be resteeled.

Now this invention has for its object to provide clearing implements free from the aforesaid disadvantages, and in a clearing implement in accordance therewith there are arranged upon a holder provided with a handle one reversible or two interchangeable and reversible strong steel plates having several cutting edges and a thinner sheet-steel plate which sharpens itself while in use and is arranged to be moved forward independently of the others. The sheet-steel plate serves for clearing when there is not too heavy a frost and is attached to the holder between the two thicker steel plates for the purpose of giving it a good backing. The sheet-steel plate wears away during work and at the same time sharpens itself and can be moved forward as it wears away, and when one of these sheet-steel plates is completely worn out another one can be easily substituted for it immediately. When the frost is more severe, the thicker steel plates are used, but only one at a time. The second plate is placed on the holder behind the first one in order to give the implement the necessary weight. The sheet-steel plate is laid in a reversed position upon the other plates, so that its working edge is turned toward the handle, and it is then fastened down by screw-bolts, so as to keep the other two plates in position. After the bolts have been loosened the thick plates can be easily reversed on the spot, so as to bring their edges successively into the working position. The four cutting edges on the plates will be found quite sufficient for one day's work, and the resharpening thereof need not be done until after working hours. Hence when using the new implement an undesirable interruption of the work, such as often becomes necessary several times a day in order to sharpen the picks and scrapers hitherto used, is no longer necessary. Both the thinner sheet-metal plate and also the thicker double-edged steel plates can be bought cheaply wholesale, so that the replacing of new plates as the old ones wear out is not so expensive as the continual resteeling required by the more costly picks and scrapers hitherto used.

In the drawings, Figure 1 is a plan of the street-cleaning implement made according to my invention. Fig. 2 is an elevation and partial cross-section on line A B, Fig. 1. Fig. 3 is a view similar to Fig. 2, showing the plate $e$ in a different position. Fig. 4 is a plan of a modification of my invention; and Fig. 5 is an elevation and partial cross-section on line C D, Fig. 4.

On a holder $a$, provided with a handle, there are fastened, by means of screw-bolts $d\ d$, two strong double-edged steel plates $b\ c$, and inserted between these is a thinner sheet-steel plate $e$. The sheet-steel plate $e$ projects to a suitable distance beyond the plates $b\ c$, and its free forward portion forms a picking and scraping edge that cuts well and sharpens itself in use. The plate $e$ when worn away almost up to the plates $b\ c$ is removed, shifted farther forward, refastened to the other parts by the bolts $d\ d$, and thereby again secured for renewed use, as shown in Fig. 3, and when the plate is worn away again it may be discarded for a new one.

Instead of being inserted between the two plates $b\ c$ the plate $e$ may of course be fastened to the holder $a$, together with only one of the plates $b\ c$, and the second plate be carried in a bag or a like receptacle, so as to be at hand and ready for use when required to be substituted for the first.

If it be desired to work with one of the stronger plates $b$ or $c$, then the plate in question is fastened to the holder $a$, as shown in Figs. 4 and 5. In the first place all three plates are removed from the holder $a$. The plate $b$ or $c$ ($c$, as shown) is then placed in the manner shown in Fig. 5 upon the bolts $d$ $d$, and the plate $b$ is then laid on the holder $a$ behind the plate $c$. A small pin $f$, which projects from the holder $a$, fits into a hole $g$ in the plate $b$ to keep the plate $b$ in place. The sheet-steel plate $e$ is then passed over the bolts $d\,d$ and laid upon the plates $c$ and $b$, arranged one in line with the other, whereupon the nuts are put on the bolts $d\,d$, and by tightening them up the plates are fastened to the holder $a$.

When the edge of the plate $c$ in the working position has become blunt, the plate in question can after removing the screw-nuts and the plate $e$ be reversed, so as to bring its second cutting edge into the working position. When this edge has also become blunt, the screw-nuts and the plate $e$ are again removed, whereupon the positions of the plates $b$ and $c$ may be interchanged, the pin $f$ engaging with the hole $h$ of the plate $c$ in order to prevent any lateral displacement of this plate. The plate $e$ is then placed in position again and the whole is fastened to the holder $a$ by means of the bolts $d\,d$. When the cutting edge of the plate $b$ has become blunt, its second cutting edge is brought into the working position in the manner already described with reference to plate $c$. When this last edge has also become blunt, the plates $b$ and $c$ are taken off and resharpened, so that they may be used again.

It is of course unnecessary to delay the sharpening till both plates $b$ and $c$ have become blunt. On the contrary, if the tool is heavy enough without it the plate that has become blunt first may be removed for sharpening, while the plate that is still sharp may continue in use. Furthermore, while the blunt plates are being sharpened two fresh duplicate plates may be fastened to the holder, so that in its fitness for uninterrupted working the new implement meets the most exacting demands. The plates which have become too small through repeated sharpening are simply exchanged for fresh ones, an operation which can also be easily carried out on the spot.

Having now particularly described and ascertained the nature of the said invention and in what manner the same is to be performed, I declare that what I claim is—

1. In an implement for cleaning streets, roads or footpaths, the combination with a handle, of a reversible plate provided with cutting edges on its opposite sides, a sheet-metal plate, and means for securing the plates and the handle together, the sheet-metal plate being adapted to be secured in different positions in regard to its relation with the other parts.

2. In an implement for cleaning streets, roads or footpaths, the combination with a handle of two interchangeable reversible and removable plates $b\,c$ both provided with cutting edges on their opposite sides, a sheet-metal plate $e$ adapted to be placed in different positions between the aforesaid plates and means for securing all three plates to the handle.

3. In an implement for cleaning streets, roads or footpaths, the combination with a handle of two interchangeable reversible and removable plates $b\,c$ both provided with cutting edges on their opposite sides, a sheet-metal plate $e$ adapted to be placed in different positions between the aforesaid plates and screw-bolts $d$ passing through the end of the handle and all three plates to secure the parts together.

4. An implement for cleaning streets, roads or footpaths, comprising a handle broadened at one end, a series of removable interchangeable plates having perforations and at least two of which have their opposite edges sharpened and bolts passing through the handle and at least two of the plates to connect the plates to the handle.

5. An implement for cleaning streets, roads, or footpaths, comprising a handle broadened at one end, a series of removable interchangeable plates having perforations and at least two of which have their opposite edges sharpened, bolts passing through the handle and at least two of the plates to connect the plates to the handle and a pin $f$ on the handle adapted to engage a perforation of one of the plates in a rearrangement of the series of plates.

In testimony that I claim the foregoing as my invention I have signed my name, in presence of two witnesses, this 13th day of December, 1902.

FRANZ DRAEGER.

Witnesses:
 GEORG RICHTER,
 GEORG HEUSSINGER.